United States Patent [19]
Yoshida

[11] 4,408,224
[45] Oct. 4, 1983

[54] SURVEILLANCE METHOD AND APPARATUS

[75] Inventor: Hajime Yoshida, Tokyo, Japan
[73] Assignee: Hajime Industries Ltd., Tokyo, Japan

[21] Appl. No.: 256,653
[22] Filed: Apr. 22, 1981
[30] Foreign Application Priority Data
May 9, 1980 [JP] Japan .................................. 55-61597
[51] Int. Cl.³ .............................................. H04M 7/18
[52] U.S. Cl. ..................................... 358/108; 358/105
[58] Field of Search ........................ 358/105, 108, 113; 250/342, 338; 280/347

[56] References Cited
U.S. PATENT DOCUMENTS
3,924,130 12/1975 Cohen et al. ........................ 358/105

*Primary Examiner*—Robert L. Griffin
*Assistant Examiner*—Edward L. Coles
*Attorney, Agent, or Firm*—Murray Schaffer

[57] ABSTRACT

A place scenery is surveilled by a video camera. The image signal from the video camera is converted to data, the data is stored in a memory as a current data and then compared with previous data which was prepared and stored in another memory in a previous surveillance period. The current and previous data is compared and an alarm signal generated when there is a difference between both data. Thereafter the previous data is erased and replaced by the current data in the memory and stored until the next image data is derived from the video camera. The operation is repeated at predetermined time intervals.

3 Claims, 7 Drawing Figures

SURVEILLANCE METHOD AND APPARATUS

BACKGROUND OF THE INVENTION

1. Field of the Invention

The present invention relates generally to surveillance methods and apparatus for place sceneries or circumstances, particularly to place scenery surveillance methods and apparatus which utilize video cameras.

2. Description of the Prior Art

Conventionally, video camera placements for surveillance by video monitors at remote locations are a widely used method for labour savings or as a means of place communication for the purposes of place scenery surveillance such as inside of stores or parking places or further for surveillance of work spots within factories or the like.

At present, various attempts are made to automate such place surveillance by such video cameras which generate alarm signals only when there are occurrences of abnormal nature at such places. In this case, since the video camera picks up the scenery of the place by the light reflection at the place and delivers its video signal, if the light radiation thereon is not constant, automatic serveillance of the place, in other words, accurate detection of abnormalities becomes difficult. When the place of scenery to be surveyed is indoors, it is possible to maintain a steady light irradiation condition on the scenery to a certain extent, but when there is sunlight beaming into such indoors, this condition may not be steady. Further, for place serveillance at outdoors, the brightness of the place scenery varies by the weather conditions, and needless to say, there is the brightness difference related to time and the automation of surveillance becomes an extremely difficult task.

Generally, many attempts have been made to stabilize such incoming brightness to the video camera by automatically adjusting the exposure degree of the optical lens on the video camera to large or small in order to respond with such brightness changes, which is good if the variation in brightness is of a degree that such automatic exposure control can follow, but in practical cases such as the sunlight, the variation is so large that complete response adjustment cannot be expected. Further, even in the case of artificial lighting, the same can be said when the degree of changes are large. In other words, it was practically impossible to automatically conduct steady surveillances of abnormal changes of scenery, such as automobile movements at parking lots or people passing in or out of a place by such surveillance systems of the prior art.

OBJECTS AND SUMMARY OF THE INVENTION

Accordingly, an object of the present invention is to provide a surveillance method according to which a place scenery can be positively and automatically surveyed and an alarm is generated when there is an abnormal occurrence in the surveyed place scenery regardless of any changes at the place scenery under surveillance such as automobile entrance or exit to parking places, movement of automobiles, or the exit or entrance of people to stores, at which the brightness of scenergy may slowly and drastically change.

Another object of the invention is to provide a surveillance apparatus which surveys a place scenery and generates an alarm when there is an abnormal occurrence in the place scenery to be surveyed regardless of any changes at the place scenery under surveillance such as automobile entrance or exit to parking places, movement of automobiles, or the exit or entrance of people to stores, at which the brightness of scenery may slowly and drastically change.

According to an aspect of the present invention, place scenery surveillance method is provided which comprises the steps of:

(a) picking up a place scernery to be surveyed by a video camera to produce a video signal;
(b) converting the video signal from said video camera into a data signal;
(c) memorizing said data signal as a current data signal;
(d) comparing said current data signal with a previous data signal which was prepared by converting a video signal from said video camera during a previous surveillance to produce an alarm signal only when said current and previous data signals are different;
(e) erasing said previous data signal after the comparing step; and
(f) memorizing said current data signal after the erasing step of said previous data signal as a new previous data signal for a next surveillance; said steps being repeated at a predetermined time interval in this order to thereby carry out surveillance of the place scenery.

According to another aspect of the invention, a place surveillance apparatus is provided which comprises:

(a) a video camera picking up a place scenery to be surveyed and producing a video signal;
(b) a data conversion means for converting the video signals responding to the place scenery from said video camera into data signal;
(c) a first memory means for memorizing said data signal from said data conversion means as a current data signal;
(d) a second memory means for memorizing a data signal from said first memory means as a previous data signal provided during a previous surveillance;
(e) a comparison means for comparing said current data signal stored in said first memory means with said previous data signal stored in said second memory means;
(f) an erasing means for erasing the previous data signal memorized in said second memory means;
(g) first through fifth switching means which are respectively inserted between said video camera and said data conversion means, said data conversion means and said first memory means, said first and second memory means and said comparison means, said erasing means and said second memory means as well as between said first memory means and said second memory means;
(h) a control means for controlling ON and OFF of said first through fifth switching means in time sharing manner; and
(i) an alarm generaing means for generating an alarm upon receiving an output that is generated by said comparison means.

Additional and other objects features and merits of the present invention will become apparent in the further descriptions taken in conjunction with the attached drawings.

DESCRIPTION OF THE PREFERRED EMBODIMENTS

One example of each of the surveillance method and apparatus according to the present invention that is suitable for the surveillance of places of scenery will be explained in reference with the attached drawings hereunder.

Figure 1:
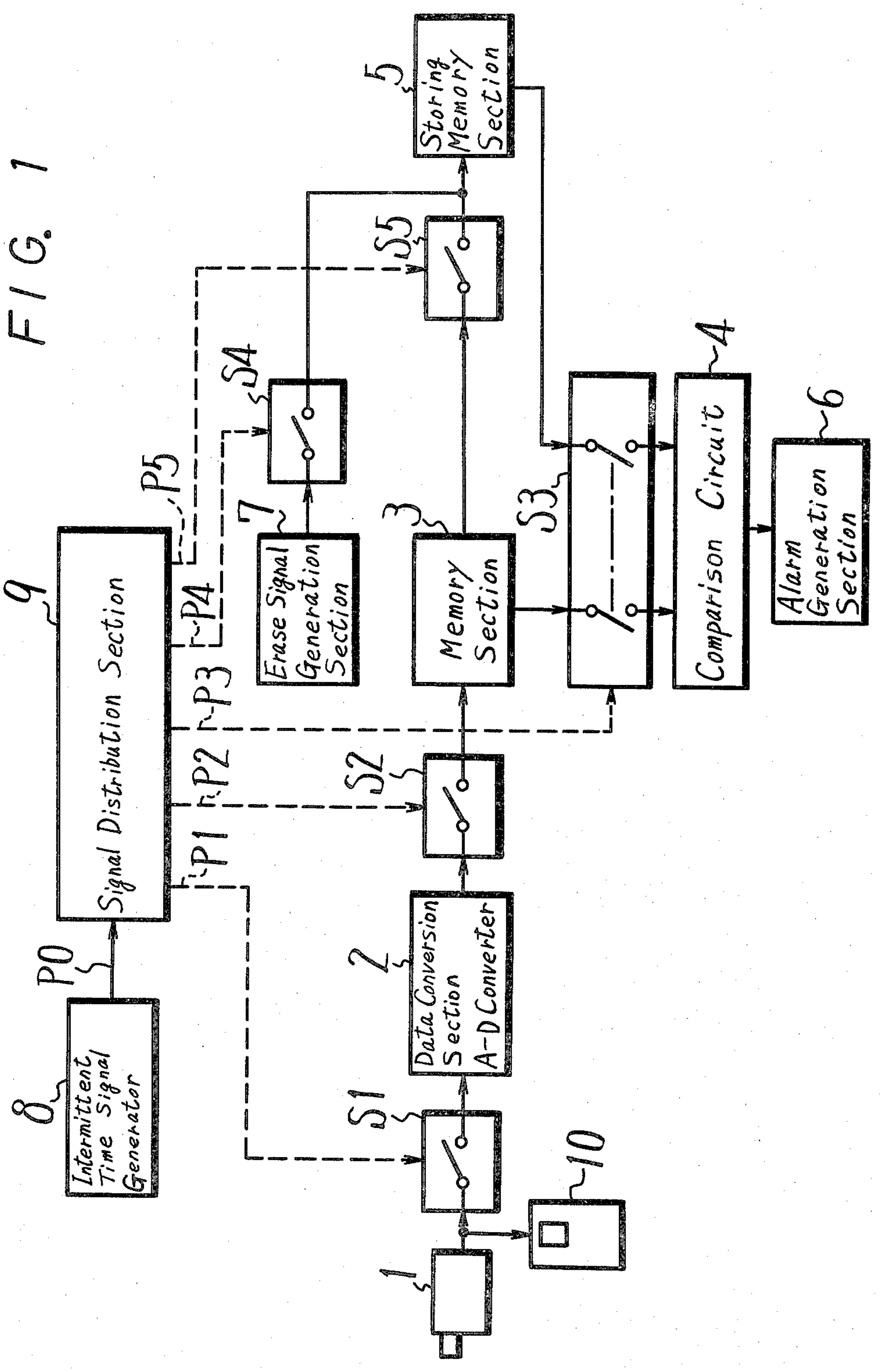
FIG. 1 is a schematic block diagram which illustrates an example of the surveillance apparatus according to the present invention which is also used to explain an example of the method of the invention.

FIG. 1 shows a systematic block diagram which illustrates one example of a surveillance apparatus by the present invention. In FIG. 1, reference numeral 1 is the video camera which picks up a place scenery to watched, such as a parking place and produces its responding information signal, in other words, a video signal. Such data (video) signal from the video camera 1 passes switch S1 and is supplied to a data conversion section 2 such as an A-D converter as an example. The digitized data signal from the data conversion section 2 passes switch S2 and is supplied to a memory section 3 for comparison, which is formed of a memory IC memory such as RAM (Random Access Memory) or the like, to be stored therein for the time being. This memorised data signal from memory section 3 passes switch S3 and is supplied to a comparison circuit 4, which is constructed of a logic comparator as an example, and at the same time supplied to storing memory section 5, which is of a memory (IC memory) such as RAM or the like, after passing switch S5. The data signal that is memorized at this storing memory section 5 passes the aforementioned switch S3 and is supplied to the comparison circuit 4 at which it is compared with the data signal from the memory section 3. If there is a difference between both data signals, the comparison circuit 4 generates an output which is in turn fed to an alarm generation section 6. At this alarm generation section 6, when the output from the comparison circuit 4 is received, alarms such as sounding a buzzer or blinkering lamps as an example are provided.

Figures 2A, 2B, 2C, 2D, 2E, 2F:
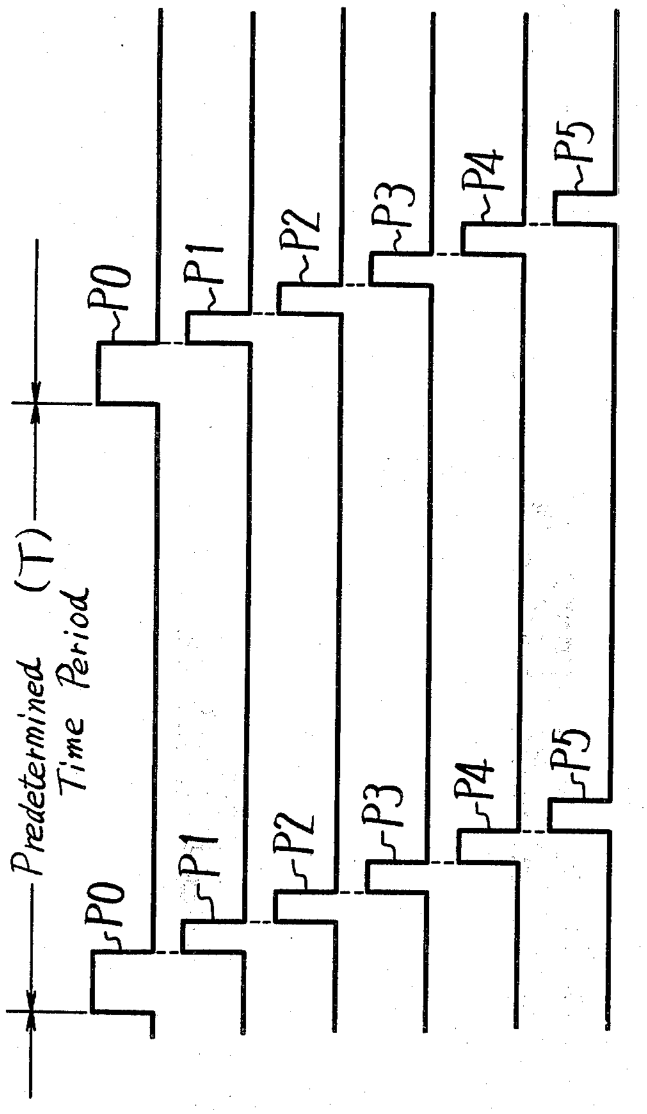
FIGS. 2A to 2F are respectively waveform diagrams used to explain the example of the invention shown in FIG 1.

Further, in FIG. 1, 7 designates an erase signal generation section by which an erase signal of low bit, for instance, is generated and such a low bit erase signal passes switch S4 and is supplied to storing memory section 5 to erase the data signal stored thereat that is old or no longer necessary. Also, 8 is an intermittent time signal generator such as a timer, at which a pulse signal P0 with a predetermined intermittent time T as shown on FIG. 2A is generated, which is supplied to a signal distribution section 9 which is formed of a shift register as an example. Then, the signal distribution section 9 consecutively generates pulse signals P1 to P5 as shown on FIGS. 2B to 2F. In other words, in this example, pulse signal P1 rises up at the falling-down edge of pulse signal P0. In the same manner, each of pulse signals P2 . . . P5 equally rises up at the falling-down edge of the pulse signal before it.

Further, such pulse signals P1 to P5 may, as shown on FIGS. 2B to 2F, not be necessarily limited to be continuous without clearance between adjacent ones, but in essence, as long as pulse signals P1 . . . P5 are generated in sequence within a predetermined time period T of pulse P0 so that there is a gap between adjacent ones of the sequential pulses, there is no problem. These pulse signals P1 to P5 are fed to the corresponding switches S1 to S5 respectively as switch signals. The switches S1 to S5 each construe of an analog switch or an AND circuit for instance and are respectively turned ON only when switch or pulse signals P1 to P5 are respectively supplied to them.

As the next step, the operation or method of the example of the present invention which construction is as above described will be explained hereunder.

In as much as the surveillance apparatus or method of the present invention repeats the operation of rest-activate-rest . . . at a predetermined time interval, such operation control is conducted by the intermittent time signal generator section 8 and the signal distribution section 9. In other words, as shown on FIG. 2A, pulse signal P0 is generated with predetermined time interval T at the signal generation section 8. Then, the signal distribution section 9 which receives this pulse signal P0 generates pulse signals P1 to P5 in sequence within the time period T of the pulse signal P0. Such pulse signals P1 to P5 are respectively fed as switch signals to switches S1 to S5. Accordingly, the apparatus completes one operation as above described.

That is, after a predetermined time period from the time when the apparatus is, for example, in rest condition, if the signal generation section 8 of the apparatus generates the pulse signal P0, the signal distribution section 9 generates the first pulse signal P1. Then, the switch S1 supplied with this pulse signal P1 becomes ON. Therefore, video (data) signal from the video camera 1 passes switch S1 and then is supplied to the data conversion section 2 to be a digital data signal. Then, the second pulse signal P2 is consecutively supplied to switch S2 from the signal distribution section 9 so that switch S2 turns ON. Accordingly, the digitalized data signal from the data conversion section 2 is supplied to the comparison memory section 3 through switch S2 to be memorized or stored therein. Further, in sequence, pulse signal P3 is supplied to switch S3 from the signal distribution section 9 to render the switch S3 ON. Therefore, the digital data signal which is stored in the comparison memory section 3 this time and the previous digital data signal representing the former scenery which was stored in the storing memory section 5 during the operation period of the previous time are both supplied to the comparison circuit 4 through switch S3 and compared thereby. Since this comparison circuit 4 produces an output when there is a difference between the two, an alarm as above mentioned is generated from the alarm generation section 6. At this point, it becomes known that the place scenery under surveillance by video camera 1 this time is different with that of the previous time. Of course there will be occasions that the comparative circuit 4 does not generate an output, in which case the place scenery under surveillance is the same at the operations this time and the previous time. Therefore, there will be no alarm generated from the alarm generation section 6 this time.

Further in sequence, the fourth pulse signal P4 is supplied to switch S4 from the signal distribution section 9, to switch the same ON, by which the erase signal from the erase signal generation section 7 is supplied to the storing memory section 5 through switch 4, whereby the data responsive to the place scenery of the previous time and stored in memory section 5 is erased. In further sequence, the fifth pulse signal P5 is supplied to switch S5 from signal distributer 9 which switches the same ON. Therefore, the data signal of the place scenery this time stored in memory section 3 is supplied to the storing memory section 5 through switch S5 at where it is stored as a standard data for the next operation occasion. Thus, the surveillance apparatus shown on FIG. 1 completes one cycle of surveillance operation and enters an intermittent rest period until the next pulse signal P0 is generated.

When the intermittent time signal generation section 8 again generates the pulse signal P0 after time period T, the signal distribution section 9 generates pulse signals P1 to P5 in sequence, which are consecutively supplied to corresponding switches S1 to S5 respectively, and the surveillance apparatus repeats the operation same as above described and then enters the next intermittent rest period.

With the above described example of the present invention, if the time interval period T between two consecutive pulse signals P0 is selected to be a negligible influence period to the gradually changing brightness of the place scenery, for instance, between 15 seconds to one minute, it can be said that between the data signals responding to the place scenery as picked up by video camera 1 during two consecutive operation periods (during which period all switch pulse signals P1 to P5 are generated) there is entirely no influence of the brightness. Therefore, only the differences of the place scenery under surveillance, such as automobile movements at a parking place, people in or out of stores, etc., will be detected. In other words, the data signal of the previous operation time is stored in the storing memory section 5, which becomes the comparative or standard data for the data signal of the operation time this time (this standard data is renewed or corrected at each time of operations). If the interval time period T between two consecutive operations is selected about 15 seconds to 1 minute as above mentioned, the brightness changes of the place scenery within this time period T is negligible to a degree that there is no effect on judgements of abnormalities at the place scenery.

As above described, in the case of the present invention, since the data signal which becomes the standard data signal as responding to the place scenery at each operation period, is always the data signal of the operation period of the previous time, in other words, the standard data signal is repeatedly renewed with short intervals of 15 seconds to 1 minute between each operation period, any changes of brightness at the place scenery is corrected with each operation time. Therefore, according to the invention, even though there is a great brightness change throughout a long spread of time, such corrections of short intervals are accumulated so that abnormality detection at place sceneries is hardly influenced by such brightness changes and may be positively conducted.

Further, the conventional automatic exposure controls for optical lenses on video cameras may be also utilized at the present invention to surely deal with brightness changes at place sceneries under surveillance.

Also, it is needless to say that the output from video camera 1 may be supplied to a video monitor 10 to avail place scenery surveillance also by the visual watching.

As a further consideration, at the example of the present invention, a CPU (central processing unit) may be used for the comparative circuit 4. In this case, it is obvious that the present invention may be carried out by the so-called software.

Further, the time interval T may not necessarily be limited to the above exemplified range and may be freely selected in compliance with the brightness changes of the place scenery to be surveyed.

It will be apparent that many modifications and variations could be effected by one skilled in the art without departing from the spirits or scope of the novel concepts of the present invention so that the spirits or scope of the invention should be determined by the appended claims only.

I claim as my invention:

1. A place scenery surveillance apparatus comprising:
(a) a video camera picking up a place scenery to be surveyed and producing a video signal;
(b) a data conversion means for converting the video signal responding to the place scenery from said video camera into data signal;
(c) a first memory means for memorizing said data signal from said data conversion means as a current data signal;
(d) a second memory means for memorizing a data signal from said first memory means as a previous data signal provided during a previous surveillance;
(e) a comparison means for comparing said current data signal stored in said first memory means with said previous data signal stored in said second memory means;
(f) an erasing means for erasing the previous data signal memorized in said second memory means;
(g) first, second and third switching means which are respectively inserted between said first and second memory means and said comparison means, said erasing means and said second memory means as well as between said first memory means and said second memory means;
(h) a control means for controlling ON and OFF of said first, second and third switching means in time sharing manner such that said first switching means is made ON at first to supply said current data signal and previous data signal to said comparison means, after said comparison being finished said second switching means being made ON to erase said previous data signal memorized in said second memory means, and then said third switching means being made ON to supply said current data signal to said second memory means to be memorized as a new previous data signal for next surveillance; and
(i) an alarm generating means for generating an alarm upon receiving an output that is generated by said comparison means.

2. A place scenery surveillance apparatus as claimed in claim 1, in which said control means includes an intermittent time signal generator and a signal distribution section, said intermittent time signal generator producing a pulse signal with a predetermined time interval, and said signal distribution section receiving said pulse signal and then producing consective pulse signals which are respectively supplied to said first third switch is to control ON and OFF of them.

3. A place scenery surveillance apparatus as claimed in claim 2, in which said consecutive pulses are all produced within a time period between adjacent pulse signals from said intermittent time signal generator or within said predetermined time interval.

* * * * *